(12) United States Patent
Ando

(10) Patent No.: US 8,448,767 B2
(45) Date of Patent: May 28, 2013

(54) ONE-WAY CLUTCH OF ROLLER TYPE

(75) Inventor: Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 473 days.

(21) Appl. No.: 12/573,101

(22) Filed: Oct. 3, 2009

(65) Prior Publication Data

US 2010/0084239 A1   Apr. 8, 2010

(30) Foreign Application Priority Data

Oct. 3, 2008   (JP) .................. 2008-258675

(51) Int. Cl.
*F16D 41/066*   (2006.01)

(52) U.S. Cl.
USPC ..................... 192/45.008; 192/45.006

(58) Field of Classification Search
USPC ............. 192/41 R, 44, 74, 45, 54.42, 41 S, 192/41 T, 38, 54.5; D15/148
See application file for complete search history.

(56) References Cited

U.S. PATENT DOCUMENTS

| | | |
|---|---|---|
| 1,708,215 A | 4/1929 | Chryst |
| 2,843,238 A | 7/1948 | Rozner |
| 2,902,125 A | 9/1959 | House et al. |
| 3,011,606 A | 12/1961 | Ferris et al. |
| 3,166,169 A | 1/1965 | Wade et al. |
| 3,190,417 A | 6/1965 | Bacon |
| 3,547,238 A | 12/1970 | Harmon |
| 3,656,591 A | 4/1972 | Marland et al. |
| 3,718,212 A | 2/1973 | Havranek |
| 4,724,940 A | 2/1988 | Lederman |
| 4,932,508 A | 6/1990 | Lederman |
| 4,986,402 A | 1/1991 | Neuwirth et al. |
| 4,995,490 A | 2/1991 | Kanai |
| 5,074,393 A | 12/1991 | Itomi |

(Continued)

FOREIGN PATENT DOCUMENTS

| | | |
|---|---|---|
| CN | 1592667 A | 3/2005 |
| DE | 29 28 587 A1 | 1/1981 |

(Continued)

OTHER PUBLICATIONS

Office Action issued May 21, 2012, in Japanese Patent Application No. 2008-258675.

(Continued)

*Primary Examiner* — Justin Holmes
*Assistant Examiner* — Stacey Fluhart
(74) *Attorney, Agent, or Firm* — Miles & Stockbridge P.C.

(57) ABSTRACT

The present invention provides a one-way clutch of roller type comprising an outer race having at least one pocket provided at its inner periphery with a cam surface, an inner race spaced apart from the outer race radially inside of the outer race and coaxially arranged for a relative rotational movement, a roller disposed in the pocket and adapted to transmit torque between the outer race and the inner race when engaged by the cam surface, a cage having a cylindrical portion with a window for holding the roller and a flange portion extending outwardly from the cylindrical portion in the outer diameter direction and rotatable relative to the outer race, the window having a circumferential window width smaller than a diameter of the roller, and a spring disposed in the pocket and adapted to bias the roller toward an engagement direction with respect to the cam surface, and wherein an inclined surface portion inclined in the axial direction is provided on the inner periphery of the pocket.

8 Claims, 3 Drawing Sheets

U.S. PATENT DOCUMENTS

| | | | |
|---|---|---|---|
| 5,271,486 A | 12/1993 | Okamoto et al. | |
| 5,279,400 A | 1/1994 | Riggle et al. | |
| 5,328,010 A | 7/1994 | Lederman | |
| 5,343,991 A | 9/1994 | Premiski et al. | |
| 5,647,800 A | 7/1997 | Warnke et al. | |
| 5,704,458 A * | 1/1998 | Neuwirth et al. | 192/45.014 |
| 5,842,548 A | 12/1998 | Sato et al. | |
| 5,941,355 A | 8/1999 | Iga | |
| 6,003,799 A | 12/1999 | Jung | |
| 6,374,974 B1 | 4/2002 | Wake | |
| 6,796,413 B2 | 9/2004 | Fukui et al. | |
| 6,848,552 B2 | 2/2005 | Miller | |
| D586,832 S * | 2/2009 | Shirataki et al. | D15/148 |
| 7,740,118 B2 | 6/2010 | Shirataki et al. | |
| 8,002,096 B2 | 8/2011 | Shirataki et al. | |
| 8,037,986 B2 | 10/2011 | Takasu | |
| 8,042,671 B2 | 10/2011 | Kinoshita | |
| 8,162,114 B2 | 4/2012 | Shirataki et al. | |
| 2003/0085092 A1 | 5/2003 | Fukui et al. | |
| 2004/0139743 A1 | 7/2004 | Sato | |
| 2005/0034951 A1 | 2/2005 | Takasu | |
| 2007/0246318 A1 | 10/2007 | Shirataki et al. | |
| 2007/0251794 A1 | 11/2007 | Shirataki et al. | |
| 2008/0196995 A1* | 8/2008 | Mikami et al. | 192/41 R |
| 2009/0242346 A1 | 10/2009 | Kinoshita | |
| 2009/0277739 A1 | 11/2009 | Takasu | |
| 2009/0301257 A1 | 12/2009 | Shirataki et al. | |
| 2010/0084239 A1* | 4/2010 | Ando | 192/45 |
| 2010/0096235 A1 | 4/2010 | Shirataki et al. | |
| 2010/0096236 A1 | 4/2010 | Ando | |
| 2010/0101910 A1* | 4/2010 | Ando | 192/45 |
| 2010/0108455 A1 | 5/2010 | Shirataki et al. | |
| 2010/0116611 A1 | 5/2010 | Shirataki et al. | |
| 2010/0213021 A1 | 8/2010 | Shirataki | |
| 2010/0258398 A1 | 10/2010 | Shirataki et al. | |
| 2010/0314211 A1 | 12/2010 | Shirataki et al. | |

FOREIGN PATENT DOCUMENTS

| | | |
|---|---|---|
| EP | 0 237 243 A1 | 9/1987 |
| JP | 05-044615 A | 2/1993 |
| JP | 08-061192 | 3/1996 |
| JP | 10-009292 A | 1/1998 |
| JP | 2003-148518 A | 5/2003 |
| JP | 2003-172377 A | 6/2003 |
| JP | 2004-346951 A | 12/2004 |
| JP | 2005-172181 A | 6/2005 |
| JP | 2006-275219 A | 10/2006 |
| JP | 2007-064475 A | 3/2007 |
| JP | 2007-278426 A | 10/2007 |
| JP | 2008-138712 A | 6/2008 |
| JP | 2008-138723 A | 6/2008 |
| TW | 354820 | 3/1999 |
| TW | I264503 B | 10/2006 |
| TW | 200801364 A | 1/2008 |
| WO | WO 03/047809 A1 | 6/2003 |
| WO | WO 2008/047457 A1 | 4/2008 |

OTHER PUBLICATIONS

Office Action issued May 10, 2012, in U.S. Appl. No. 12/680,376.

Office Action issued Aug. 6, 2010 in Taiwan Patent Application No.

Office Action issued May 21, 2012 in Japanese Patent Application No. 2008-279407.

Office Action issued Apr. 16, 2012 in Japanese Patent Application No. 2008-148984.

Office Action issued May 21, 2012 in Japanese Patent Application No. 2008-267227.

Office Action dated May 14, 2012 in Chinese Appln. No. CN 200880127624.2.

\* cited by examiner

ONE-WAY CLUTCH OF ROLLER TYPE

This application claims the benefit of Japanese Patent Application No. 2008-258675, filed Oct. 3, 2008, which is hereby incorporated by reference herein in its entirety.

BACKGROUND OF THE INVENTION

1. Field of the Invention

The present invention relates to a one-way clutch of roller type used as a part such as a torque transmitting element or a back stopper in a driving apparatus of a motor vehicle, an industrial machine and the like, for example.

2. Related Background Art

In general, a one-way clutch of roller type is comprised of an outer race having at least one pocket provided at its inner periphery with a cam surface, an inner race disposed in concentric with the outer race and having an outer peripheral track surface, a roller disposed within the pocket and adapted to transmit torque between the outer peripheral track surface of the inner race and the inner peripheral cam surface of the outer race, and a spring contacted with an idle rotation side of the roller.

With this arrangement, in the one-way clutch, the inner race is designed so as to be rotated only in one direction with respect to the outer race by means of a cam mechanism constituted by the roller and the cam surface. That is to say, the inner race is designed so that it is idly rotated relative to the outer race in one direction, and on the other hand, it applies rotational torque to the outer race through the cam mechanism only in an opposite direction.

For example, since a one-way clutch used as a starter of a motor bike is used under a high speed rotation and great vibration condition and a severe condition in which the clutch is exposed to powder dust, foreign matters such as dust including worn powder are apt to be accumulated in the one-way clutch. Since the foreign matters accumulated in the one-way clutch affect a bad influence upon engaging performance, it is preferable to remove the foreign matters promptly in order to enhance the performance of the one-way clutch. Japanese Patent Application Laid-open No. 10-009292 (1998) discloses a method for removing dust accumulated in a one-way clutch, in which grooves are formed in a side surface of an outer race and the dust is discharged through the grooves formed.

On the other hand, in the one-way clutch of roller type, to obtain positive engagement, the rollers as torque transmitting members and the springs for biasing the rollers must be prevented from being dislodged from the pockets in an axial direction and a radial direction.

Further, in order to enhance the performance of the one-way clutch, it has been proposed to lubricate the members. For example, in the above-mentioned Japanese Patent Application Laid-open No. 10-009292 discloses an arrangement in which a one-way clutch of sprag type as a one-way clutch used as a starter of a motor bike is lubricated by oil, and, in Japanese Patent Application Laid-open No. 5-044615 (1993) discloses an arrangement in which a starter clutch of roller type is lubricated by oil.

In comparison with the one-way clutch of sprag type, the one-way clutch of roller type has an excellent idle rotation endurance ability and does not generate mal-function due to roll over of the sprags (as is in the one-way clutch of sprag type) if great load is applied; however, as is shown in the above-mentioned Japanese Patent Application Laid-open No. 5-044615, unlike to the one-way clutch of sprag type in which the engaging ability is enhanced by synchronous movements of the sprags by means of a cage of sprag type one-way clutch, in the one-way clutch of roller type, such an engaging ability cannot be enhanced and side plates for preventing dislodgement of the rollers and the springs must be provided, thereby preventing reduction in cost.

In this way, for example, as the one-way clutch used as the starter of the motor bike, it is desirable to obtain a one-way clutch of roller type which is cheaper in comparison with the conventional clutches and in which engaging reliability is more enhanced in comparison with the conventional clutches.

SUMMARY OF THE INVENTION

Accordingly, an object of the present invention is to provide a one-way clutch of roller type having an arrangement which is capable to discharge foreign matters such as dust including worn powder accumulated in the one-way clutch of roller type, thereby enhancing reliability and thereby to realize reduction in cost by preventing rollers as torque transmitting members and springs for biasing the rollers from being dislodged in an axial direction and a radial direction without using conventional side plates for preventing such dislodgement.

To achieve the above object, the present invention provides a one-way clutch of roller type comprising an outer race having at least one pocket provided at its inner periphery with a cam surface, an inner race spaced apart from the outer race radially inside of the outer race and coaxially arranged for a relative rotational movement, a roller disposed in the pocket and adapted to transmit torque between the outer race and the inner race when engaged by the cam surface, a cage having cylindrical portion with a window for holding the roller and a flange portion extending outwardly from the cylindrical portion in the outer diameter direction and rotatable relative to the outer race, the window having a circumferential window width smaller than a diameter of the roller, and a spring disposed in the pocket and adapted to bias the roller toward an engagement direction with respect to the cam surface, and wherein an inclined surface portion inclined in the axial direction is provided on the inner periphery of the pocket.

Further, preferably, in the one-way clutch of roller type according to the present invention, the inclined surface portion extends in such a manner that an outer diameter of the pocket is increased from an axial one end face of the outer race on which the flange portion of the cage is provided and to which an input/output member is attached toward an axial other end face of the outer race on which an end of the cage opposed to the flange portion is provided.

Further, preferably, in the one-way clutch of roller type according to the present invention, the inclined surface portion extends in such a manner that the outer diameter of the pocket is increased from an axial intermediate portion of the inner periphery of the pocket toward the axial end face of the outer race on which the end of the cage opposed to the flange portion is provided.

Further, preferably, in the one-way clutch of roller type according to the present invention, the inclined surface portion is provided on a circumferential part of the inner periphery of the pocket which does not include a roller engaging surface of the cam surface.

Further, preferably, in the one-way clutch of roller type according to the present invention, the inclined surface portion is provided on a circumferential part of the inner periphery of the pocket which includes a maximum diameter portion of the cam surface.

Further, preferably, in the one-way clutch of roller type according to the present invention, the inclined surface portion is provided on a circumferential part of the inner periphery of the pocket which includes only the maximum diameter portion of the cam surface.

Further, preferably, in the one-way clutch of roller type according to the present invention, the inclined surface portion is formed by forging.

Further, preferably, in the one-way clutch of roller type according to the present invention, the inclined surface portion is formed by milling.

In the one-way clutch of roller type according to the present invention, by forming the inclined surface portion inclined in the axial direction in the inner periphery of the pocket provided in the outer race, the foreign matters such as dust is discharged along the inclination of the inclined surface portion by the centrifugal force generated by the rotation of the outer race, with the result that the operation of the cage due to the accumulated foreign matters can be prevented from being worsened and the prevention of the wear of the rollers, springs, inner race and cam surface of the outer race can be promoted, thereby providing a one-way clutch of roller type having more reliability.

In addition, by the outer race and by the end flange positioned at the axial one side of the pocket and by the cage including the window (into which the roller is seated) having the window width smaller than the diameter of the roller in the circumferential direction and extending through the cage in the radial direction and also having both closed ends in the axial direction, the roller is prevented from being dislodged from the cage in the axial direction and the radial inward direction.

Further, by fitting the flange portion of the cage into the stepped portion provided on the inner diameter portion of the end face of the outer race and by securing the input/output member (not shown) such as a generator (not shown) to which the outer race 1 is attached to the end face of the outer race near the flange portion, the dislodgement of the cage is prevented.

Furthermore, by securing one end of the spring to the end face of the outer race or by providing means for preventing the dislodgement of the spring on the end portion of the outer race, the dislodgement of the spring is prevented.

Accordingly, side plates which are required in the conventional one-way clutch of roller type can be omitted, thereby reducing the cost of the clutch.

Further, by designing so that the cage can be rotated relative to the outer race, when the circumferential window width of the cage is smaller than the diameter of the roller to prevent the dislodgement of the roller in the radial direction, since the cage does not obstruct the movement of the roller during the engaging operation of the one-way clutch and during the idle rotation, smooth engagement and idle rotation can be realized, and, regarding the movements of all rollers, the cage affords the synchronous action, thereby providing a one-way clutch of roller type having more engaging reliability.

Further features of the present invention will become apparent from the following description of exemplary embodiments with reference to the attached drawings.

DETAILED DESCRIPTION OF THE INVENTION

Now, embodiments of the present invention will be fully explained with reference to the accompanying drawings. Incidentally, it should be noted that the embodiments which will be described below are merely examples and other alterations and modifications can be made.

Figure 1:
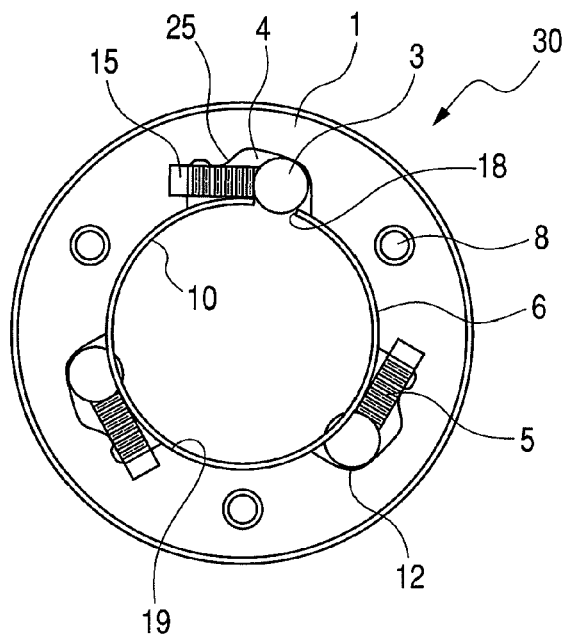
FIG. 1 is a front view showing a one-way clutch of roller type according to an embodiment of the present invention in a condition that the clutch is engaged under a high load.
Figure 2:
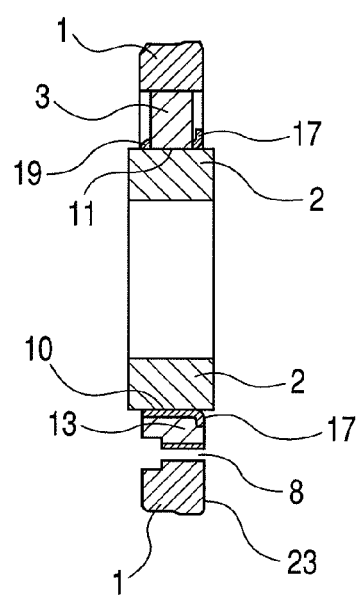
FIG. 2 is a sectional view taken along the line A-O-A of FIG. 3.
Figure 3:
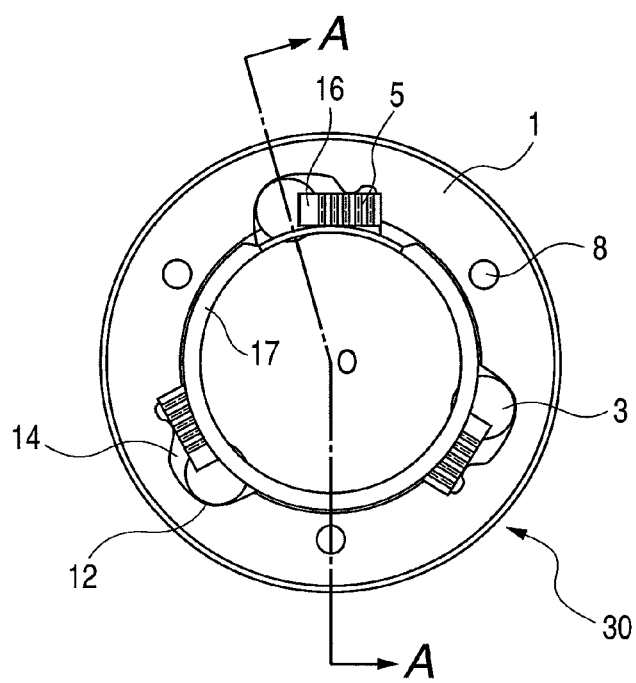
FIG. 3 is a front view looked at from a rear side of FIG. 1.

FIG. 1 is a front view showing a one-way clutch of roller type according to an embodiment of the present invention, and FIG. 3 is a front view looked at from a rear side of FIG. 1. Further, FIG. 2 is a sectional view taken along the line A-O-A of FIG. 3.

FIGS. 1 to 3 show a condition that rollers are engaged by cam surfaces, i.e. a condition that the one-way clutch is engaged under a high load and is locked.

As shown in FIG. 1, a one-way clutch 30 of roller type comprises an annular outer race 1 provided at its inner periphery with a plurality of pockets 4 formed as recesses having cam surfaces 12, an inner race 2 (shown in FIG. 2) spaced inwardly from the outer race 1 in a radial direction and rotatable relative to the outer race and disposed in concentric with the outer race and having an annular outer peripheral track surface 11, rollers 3 disposed in the respective pockets 4 and adapted to transmit torque between the outer peripheral track surface 11 of the inner race 2 and the inner peripheral cam surfaces 12 of the outer race 1, springs 5 for biasing the rollers 3 toward engagement directions with respect to the cam surfaces 12, and a cage 6 for holding the rollers 3. The cage 6 is not secured to either the outer race 1 or the inner race 2, and, thus, can be rotated relative to the outer race 1 and the inner race 2.

In the illustrated embodiment, there are three pockets 4 provided in the outer race 1, which pockets are disposed equidistantly along a circumferential direction. Further, three rivet holes 8 used for securing the outer race 1 to an input/output member (not shown) and extending through the outer race in an axial direction are also disposed equidistantly along the circumferential direction, and the pockets 4 and the rivet holes 8 are arranged alternately and equidistantly along the circumferential direction. Of course, it should be noted that the number of the pockets 4 can be set to be three to six, for example, in accordance with the magnitude of the torque.

As shown in FIGS. 2 and 3, the cage 6 for holding the rollers 3 comprises a cylindrical portion 10 and an annular flange portion 17 extending radially outwardly from an axial one end of the cylindrical portion 10. Incidentally, in FIG. 3, the flange portion 17 is partially broken so that the pockets 4 can be seen.

Further, the cage 6 has windows 18 the number of which corresponds to the number of rollers 3. The window 18 extends through the cage in the radial direction, but, in the axial direction, both an end of the window near the flange portion 17 and an end 19 remote from the flange portion 17 are closed. In the circumferential direction, a width of the window is smaller than a diameter of the roller. That is to say, the roller 3 is seated in a substantially rectangular window 18 encircled by four sides, thereby preventing the roller 3 from being dislodged in the inner diameter direction. To show a relationship between the window 18 and the roller 3, in FIG. 1, the end 19 of the uppermost window 18 is broken away.

One end i.e. tab 15 of each spring 5 is locked to the axial end face of the outer race 1, as shown in FIG. 1, and, the other end i.e. tab 16 of the spring is pinched between an axial end face of the roller 3 and the flange portion 17 of the cage 6, as shown in FIG. 3. With this arrangement, the spring 5 itself is fixedly supported with respect to the outer race 1, with the result that dislodgement of the spring 5 can be prevented and, at the same time, the roller 3 can be prevented from being dislodged in the axial direction.

In the illustrated embodiment, although an accordion spring is used as the spring 5, other type of spring such as a coil spring can be used.

As shown in FIGS. 2 and 3, an annular stepped portion 13 is provided on an axial edge portion of the inner peripheral surface of the outer race 1, and the flange portion 17 of the cage 6 is engaged by the stepped portion 13. An axial depth of the stepped portion 13 is slightly greater than a thickness of the flange portion 17 so that, when the flange portion 17 is engaged by the stepped portion 13, a clearance is generated between an axial end face 23 of the outer race 1 and an axial end face of the flange portion 17. Accordingly, when the outer race 1 of the one-way clutch 30 is secured to the input/output member (not shown), a clearance is generated between the input/output member and the axial end face of the flange portion 17.

Thus, the cage 6 can be rotated relative to the outer race 1 and the dislodgement of the cage in the axial direction can be prevented.

As shown in FIG. 1, an inclined surface portion 25 inclined in the axial direction is formed in a circumferential part of the inner periphery of each pocket 4.

Figure 4:
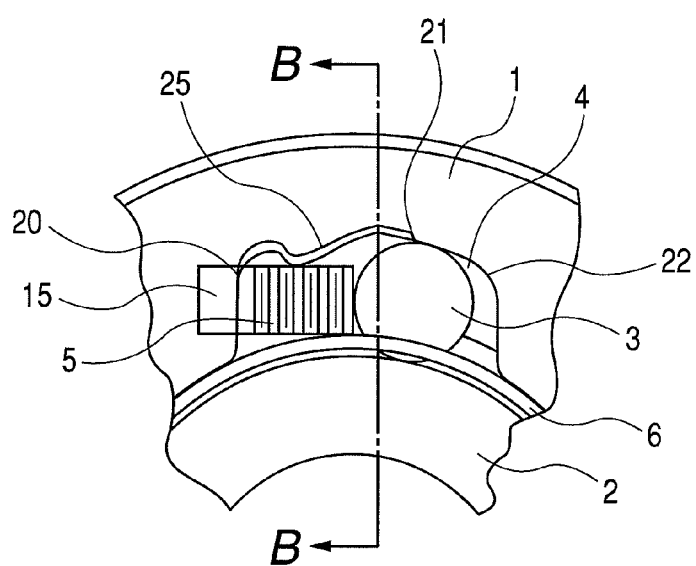
FIG. 4 is an enlarged front view of an inclined surface portion of the one-way clutch of roller type according to the embodiment of the present invention in a condition that the engagement is started.
Figure 5:
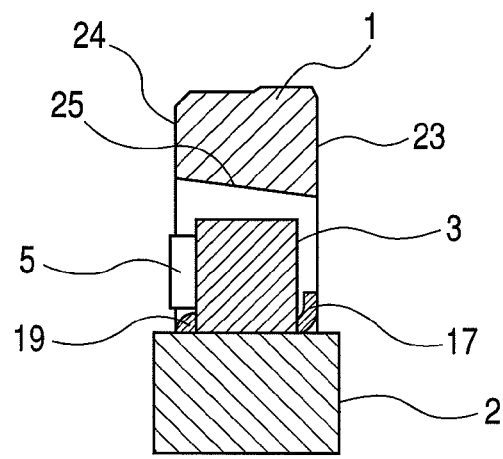
FIG. 5 is a sectional view taken along the line B-B of FIG. 4.

FIG. 4 is an enlarged front view of the one-way clutch of roller type according to the embodiment of the present invention, showing the inclined surface portion 25 in detail. FIG. 5 is a sectional view taken along the line B-B of FIG. 4 and FIG. 6 is a sectional view taken along the line B-B of FIG. 4, showing another embodiment of the present invention.

As shown in FIG. 4, the cam surface is divided into an engaging area shown as an area between the reference numerals 21 and 22 and a non-engaging area shown as an area between the reference numerals 20 and 21. Here, the engaging area is defined by a cam surface starting from a position 21 where the roller begins to engage and extending toward a loading side.

Figure 6:
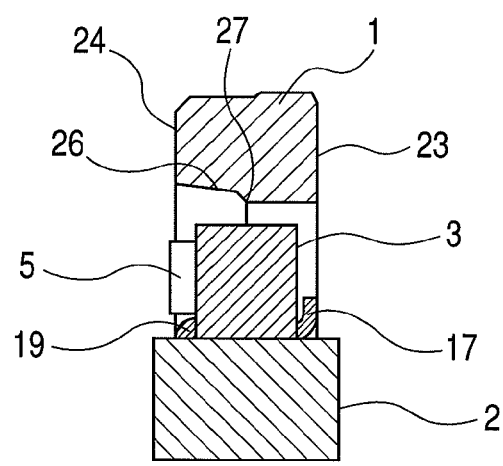
FIG. 6 is a sectional view taken along the line B-B of FIG. 4, showing another embodiment of the present invention.

Accordingly, FIGS. 4 to 6 show a condition that the roller exists in the engaging area and the roller begins to engage i.e. a condition that the load begins to be applied between the outer race and the inner race of the one-way clutch.

As shown in FIGS. 4 and 5, in the illustrated embodiment, at a circumferential part of the inner periphery of the pocket 4, the inclined surface portion 25 formed integrally with the outer race 1 with predetermined inclination in the axial direction so that an outer diameter of the pocket 4 is increased from an axial end face 23 of the outer race 1 on which the flange portion 17 of the cage 6 is provided toward an axial end face 24 of the outer race 1 on which an end 19 of the cage 6 opposed to the flange portion 17 is provided.

By providing such an inclined surface portion 25, when the outer race 1 is rotated, foreign matters such as worn powder and dust accumulated in the pocket 4 are shifted along the inclination of the inclined surface portion 25 by a centrifugal force generated, with the result that the foreign matters are discharged out of the one-way clutch 30 i.e. discharged from the axial end face 24 of the outer race 1 on which the end 19 of the cage 6 is provided in the illustrated embodiment.

The inclined surface portion 25 is inclined so that the outer diameter of the pocket is increased toward a side where the input/output member (not shown) such as a generator (not shown) to which the outer race 1 is attached does not exists. By doing so, the dust can be discharged smoothly from the one-way clutch.

Further, for example, in another embodiment shown in FIG. 6, at a circumferential part of the inner periphery of the pocket 4 and at only an axial part, an inclined surface portion 26 may be formed integrally with the outer race 1 with predetermined inclination so that the outer diameter of the pocket 4 is increased from an axial intermediate portion 27 of the inner periphery toward the axial end face 24 of the outer race 1 on which the end 19 of the cage 6 is provided.

As shown in FIG. 4, it is preferable that the inclined surface portion 25 is provided not to include the engaging area for the roller i.e. provided in the inner periphery of the pocket 4 in the non-engaging area. If the inclined surface portion is provided in the engaging area, a skew movement of the roller may be generated to worsen the engaging ability and/or to cause deformation and/or wear of the cage, thereby affecting a bad influence upon the operation of the one-way clutch.

Further, as shown in FIG. 4, it is preferable that the inclined surface portion 25 is provided in a circumferential part of the inner periphery of the pocket 4 to include a maximum diameter portion of the cam surface 12. By providing the inclined surface portion 25 at the position where the maximum diameter portion of the cam surface 12 is included, the foreign matters such as worn powder and dust accumulated in the outer diameter portion of the outer race 1 can be discharged more efficiently out of the one-way clutch 30 along the inclination of the inclined surface portion 25 by the centrifugal force.

Further, the inclined surface portions 25 and 26 may be provided in a circumferential part of the inner periphery of the pocket 4 to include only the maximum diameter portion of the cam surface 12.

The inclined surface portions 25 and 26 can be formed by forging or milling.

In the above-mentioned embodiments, while an example that the inclined surface portions 25 and 26 are formed integrally with the outer race 1 was explained, the inclined surface portions may be formed separately from the outer race 1 and may be secured to the outer race 1 by clip fastening or welding.

Further, while an example that each of the inclined surface portions 25 and 26 is formed as a flat surface was explained, each of the inclined surface portions may be constituted by a curved surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A one-way clutch of roller type comprising:
    an outer race having at least one pocket provided at its inner periphery with a cam surface;
    an inner race spaced apart from said outer race radially inside of said outer race and coaxially arranged for a relative rotational movement;
    a roller disposed in said pocket and adapted to transmit torque between said outer race and said inner race when engaged by said cam surface;
    a cage having a cylindrical portion with a window for holding said roller and a flange portion extending outwardly from said cylindrical portion in an outer diameter direction and rotatable relative to said outer race, said window having a circumferential window width smaller than a diameter of said roller; and a spring disposed in said pocket and adapted to bias said roller toward an engagement direction with respect to said cam surface;

and wherein an inclined surface portion inclined in the axial direction is provided on the inner periphery of said pocket.

2. A one-way clutch of roller type according to claim 1, wherein said inclined surface portion extends in such a manner that an outer diameter of said pocket is increased from an axial one end face of said outer race on which said flange portion of said cage is provided and to which an input/output member is attached toward an axial other end face of said outer race on which an end of said cage opposed to said flange portion is provided.

3. A one-way clutch of roller type according to claim 1, wherein said inclined surface portion extends such that an outer diameter of said pocket is increased from an axial intermediate portion of the inner periphery of said pocket toward an axial other end face of said outer race.

4. A one-way clutch of roller type according to claim 1, wherein said inclined surface portion is provided on a circumferential part of the inner periphery of said pocket which does not include a roller engaging surface of said cam surface.

5. A one-way clutch of roller type according to claim 1, wherein said inclined surface portion is provided on a circumferential part of the inner periphery of said pocket which includes a maximum diameter portion of said cam surface.

6. A one-way clutch of roller type according to claim 1, wherein said inclined surface portion is provided on an axial part of the inner periphery of said pocket which includes only a maximum diameter portion of said cam surface.

7. A one-way clutch of roller type according to claim 1, wherein said inclined surface portion is formed by forging.

8. A one-way clutch of roller type according to claim 1, wherein said inclined surface portion is formed by milling.

* * * * *